United States Patent
Baron et al.

(10) Patent No.: US 9,542,237 B2
(45) Date of Patent: Jan. 10, 2017

(54) SHARED LOCKING FOR STORAGE CENTRIC EXCLUSIVE LOCKS

(75) Inventors: Ayal Baron, Kiryat Ono (IL); Federico Simoncelli, Fano (IT); Eduardo Warszawski, Kfar Saba (IL)

(73) Assignee: Red Hat Israel, Ltd., Raanana (IL)

(*) Notice: Subject to any disclaimer, the term of this patent is extended or adjusted under 35 U.S.C. 154(b) by 276 days.

(21) Appl. No.: 13/602,779

(22) Filed: Sep. 4, 2012

(65) Prior Publication Data
US 2014/0068127 A1  Mar. 6, 2014

(51) Int. Cl.
G06F 12/00 (2006.01)
G06F 12/14 (2006.01)
G06F 9/52 (2006.01)

(52) U.S. Cl.
CPC ......... *G06F 9/526* (2013.01); *G06F 2209/522* (2013.01); *G06F 2209/523* (2013.01)

(58) Field of Classification Search
CPC ............ G06F 12/14; G06F 9/52; G06F 9/526; G06F 17/30008; G06F 9/524; G06F 9/3851
USPC ....................................................... 710/200
See application file for complete search history.

(56) References Cited

U.S. PATENT DOCUMENTS

| | | | | |
|---|---|---|---|---|
| 5,226,143 A * | 7/1993 | Baird | ................. | G06F 12/0815 711/112 |
| 5,285,528 A * | 2/1994 | Hart | .......................... | G06F 9/52 710/200 |
| 5,423,044 A * | 6/1995 | Sutton et al. | ................. | 710/200 |
| 5,454,108 A * | 9/1995 | Devarakonda et al. | ...... | 718/104 |
| 5,933,824 A * | 8/1999 | DeKoning | ................ | G06F 9/52 |
| 5,987,550 A * | 11/1999 | Shagam | ............. | G06F 13/1652 710/108 |
| 6,145,006 A * | 11/2000 | Vishlitsky | ............... | G06F 3/062 709/229 |
| 6,199,105 B1 * | 3/2001 | Soejima | .................... | G06F 9/52 709/213 |
| 6,463,503 B1 * | 10/2002 | Jones et al. | ................... | 711/114 |
| 6,965,893 B1 * | 11/2005 | Chan et al. | | |
| 7,062,615 B2 * | 6/2006 | Miller et al. | .................. | 711/152 |
| 7,328,263 B1 * | 2/2008 | Sadjadi | ................... | G06F 9/526 707/999.008 |
| 7,398,323 B1 * | 7/2008 | Gerraty | ............... | H04L 41/0803 709/223 |
| 8,561,064 B2 * | 10/2013 | Eide et al. | ........................ | 718/1 |
| 8,571,882 B1 * | 10/2013 | Teitelbaum | ....... | G06F 17/30575 705/2 |
| 2002/0065968 A1 * | 5/2002 | Bryant et al. | ................. | 710/200 |
| 2003/0014598 A1 * | 1/2003 | Brown | ................ | G06F 11/1076 711/141 |

(Continued)

OTHER PUBLICATIONS

Sanlock "sanlock—shared storage lock manager," <https://fedorahosted.org/sanlock/>, Sep. 16, 2011, 7 pages.

*Primary Examiner* — Faisal M Zaman
(74) *Attorney, Agent, or Firm* — Lowenstein Sandler LLP

(57) ABSTRACT

A computing device receives a request from a host for a shared lock on a resource. The computing device obtains an exclusive lock on the resource using a locking data structure that is stored on the storage domain. The computing device subsequently obtains a shared lock on the resource for the host by writing a flag to the locking data structure, wherein the flag indicates that the host has the shared lock on the resource. The computing device then releases the exclusive lock on the resource.

20 Claims, 6 Drawing Sheets

(56) References Cited

U.S. PATENT DOCUMENTS

| | | | |
|---|---|---|---|
| 2003/0105871 A1* | 6/2003 | Goldick | G06F 9/526 709/229 |
| 2004/0064618 A1* | 4/2004 | Farrell et al. | 710/200 |
| 2004/0172395 A1* | 9/2004 | Edelstein | G06F 17/30115 |
| 2004/0226021 A1* | 11/2004 | Miki et al. | 719/313 |
| 2004/0236918 A1* | 11/2004 | Okaue | G06F 21/10 711/164 |
| 2005/0033888 A1* | 2/2005 | Qi | G06F 3/0607 710/200 |
| 2005/0165938 A1* | 7/2005 | Cornett | 709/229 |
| 2005/0216661 A1* | 9/2005 | Kano | G06F 3/0605 711/114 |
| 2005/0223014 A1* | 10/2005 | Sharma | G06F 17/30197 |
| 2005/0289143 A1* | 12/2005 | Oshri | G06F 17/30171 |
| 2007/0185872 A1* | 8/2007 | Ho | G06F 9/526 |
| 2007/0198978 A1* | 8/2007 | Dice et al. | 718/100 |
| 2008/0163217 A1* | 7/2008 | Accapadi et al. | 718/100 |
| 2009/0119425 A1* | 5/2009 | Litovtchenko et al. | 710/55 |
| 2009/0240860 A1* | 9/2009 | Coon et al. | 710/200 |
| 2009/0282462 A1* | 11/2009 | Skaria | G06F 21/6218 726/3 |
| 2011/0173356 A1* | 7/2011 | Prabhu | G06F 9/526 710/108 |
| 2012/0102080 A1* | 4/2012 | Kirihata | G06F 21/604 707/831 |

\* cited by examiner

SHARED LOCKING FOR STORAGE CENTRIC EXCLUSIVE LOCKS

TECHNICAL FIELD

Embodiments of the present invention relate to locking of shared storage, and more specifically to a locking mechanism that manages shared locks using reserved spaces on shared storage that represent locking states for resources.

BACKGROUND

For shared storage, all hosts on a cluster may have access to the same data. Multiple hosts may attempt to read from or write to specific resources at the same time. This can create errors and cause the hosts to malfunction or crash due to unsynchronized resources. Accordingly, locking managers are used to assign locks (also known as leases) to individual hosts. This ensures that while a host with a lock is using a resource, another host will not be able to modify the resource. Additionally, lock managers may manage locks for other types of resources than shared storage.

Some locking mechanisms manage locks on resources using the storage domain that stored those resources. However such locking mechanisms typically only provide exclusive locks to the resources. One such locking mechanism is the Paxos protocol.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for managing locks on shared resources (e.g., resources in a clustered environment). A lock manager may generate one or more locking data structures that identify resources that are locked and hosts holding the locks. These locking data structures may be stored in storage domains, which may be the same storage domains that store some or all of the resources. Accordingly, a current lock state for any resource can be determined simply by reading the locking data structure associated with that resource in the storage domain. This enables locking to be performed without the use of any centralized locking mechanism, which might act as a bottleneck, could crash, etc. Additionally, this enables different hosts with different capabilities and configurations to all share usage of resources using the locking data structures.

The lock manager may grant both shared locks (also referred to as read only locks) and exclusive locks (also referred to as read/write locks). If a host has a shared lock to a resource, then other hosts can still read the resource and can also obtain shared locks on the resource. However, no host can acquire an exclusive lock for, or write to, a resource that has a shared lock on it. In contrast, if a host has an exclusive lock to a resource, then no other resource can read from or write to the resource. Nor can the other resources acquire shared or exclusive locks on the resource while there is an exclusive lock on the resource.

In one embodiment, when the lock manager receives a request from the host for a shared lock, the lock manager initially obtains an exclusive lock to the resource for the host. The lock manager then obtains a shared lock by writing a flag to a locking data structure at a region that is associated with the host and the resource in question. Subsequently, the lock manager releases the exclusive lock on the resource. Thereafter, any other host can also obtain a shared lock on the resource, following the same procedure. Once the host no longer needs the shared lock, it may signal the lock manager to release the lock. In response, the lock manager may remove the flag from the region of the locking data structure associated with the host and the resource.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
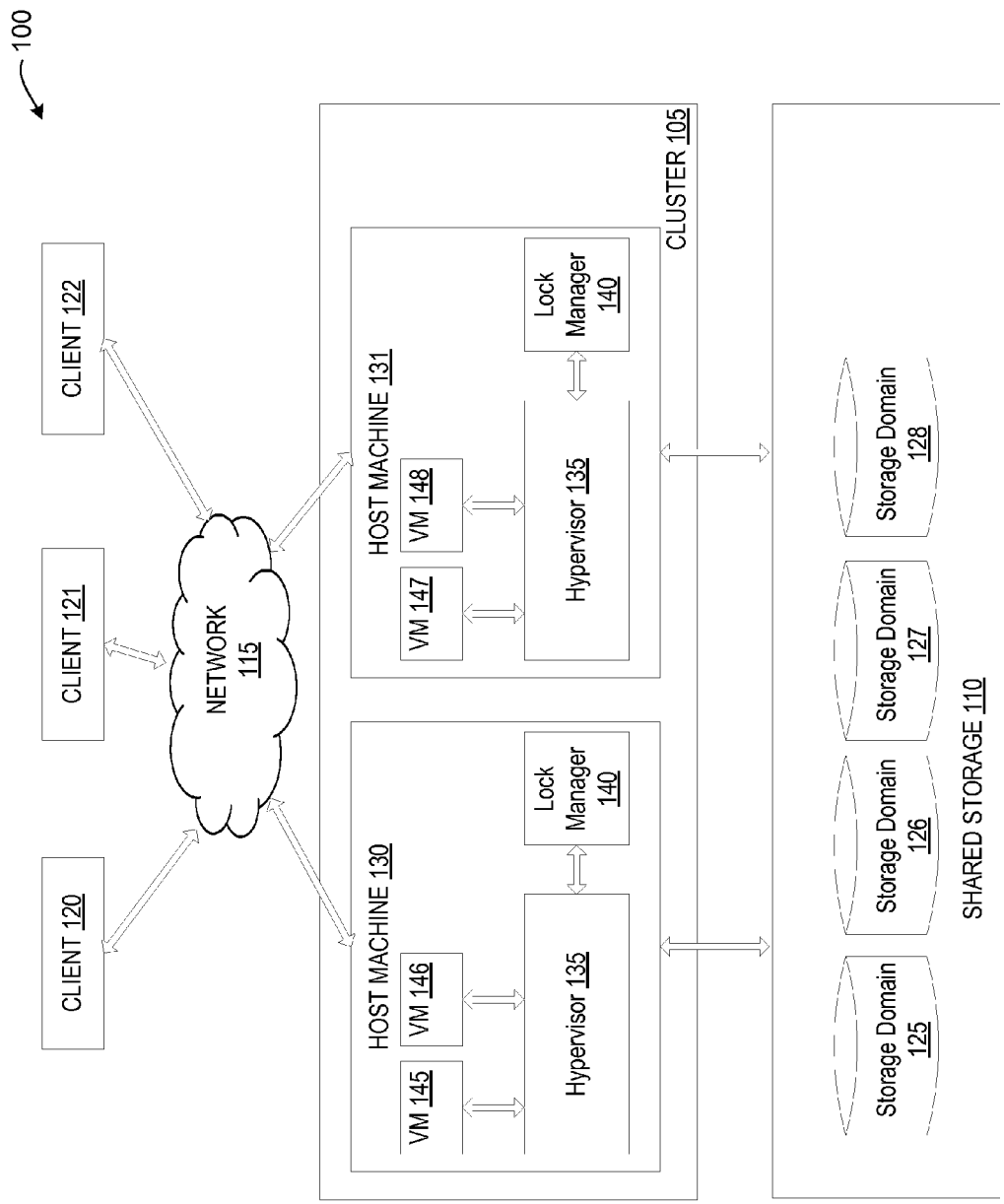
FIG. 1 illustrates an exemplary network architecture in which embodiments of the present invention may operate.

FIG. 1 illustrates an exemplary network architecture 100, in which embodiments of the present invention may operate. The network architecture 100 includes a cluster of host machines 105 (also referred to as "cluster 105") coupled to one or more clients 120-122 over a network 115. The network 115 may be a private network (e.g., a local area network (LAN), a wide area network (WAN), intranet, etc.), a public network (e.g., the Internet), or a combination thereof. The cluster 105 includes multiple host machines 130, 131, with each host machine 130, 131 including one or more virtual machines 145-148. The cluster 105 is also coupled to shared storage 110. The shared storage 110 may include one or more mass storage devices (e.g., disks), which may form a storage pool shared by all of the host machines 130-131 in the cluster 105.

In one embodiment, the shared storage 110 is a network-based storage system, such as network attached storage (NAS), a storage area networks (SAN), or other storage system. Another example of a network-based storage system is cloud storage (also known as storage as a service (SaaS), as provided by Amazon® Simple Storage Service (S3®), Rackspace® Cloud Storage, etc. Network-based storage systems are commonly used for a variety of purposes, such as providing multiple users with access to shared data, backing up critical data (e.g., by data mirroring), etc.

Shared storage 110 may include multiple different storage domains 125-128. Each storage domain may be a physically or logically distinct storage device. Storage domains 125-128 may be block domains that handle data at a block level. Such storage domains may be accessible via small computer system interface (SCSI), internet small computer system interface (iSCSI), Fibre Channel Protocol (FCP), ATA over Ethernet (AoE), or other block I/O protocols. Storage domains 125-128 may also be file domains that handle data at a file level. Such storage domains may include a file system such as, for example a network file system (NFS), a common internet file system (CIFS), a fourth extended file system (EXT4), an XFS file system, a hierarchical file system (HFS), a BTRFS file system, or other file system.

Each storage domain 125-128 may contain locking data structures for a collection of resources. The locking data structures may be reserved spaces on shared storage that represent locking states for the resources. The resources may include data and objects that are stored in the storage domains 125-128 as well as logical resources that are not stored in any storage domain. One standard type of resource is a virtual disk image. However, resources may be any type of object, such as anything that can be stored in shared storage and/or anything whose lock state can be managed via the shared storage. Some resources may be a single file, set of files or sequence of data (e.g., a contiguous or non-contiguous set of blocks in a block device) that contains the contents and structure representing the resource (e.g., a virtual image). Examples of resources include libraries, files, logical volumes, processes, threads, roles, capabilities, services, and so on. For example, the cluster may have a single storage pool manager (SPM) that is responsible for performing operations in the cluster such as moving data, changing configurations, and so forth. Any host may assume the role of the SPM by acquiring an exclusive lock on the SPM resource. The actual composition of the resources on the storage domains 125-128 may depend on a storage type for that storage domain (e.g., whether or not it includes a file system, a type of file system, etc.) as well as a type of resource.

Each host machine 130-131 may be a rackmount server, a workstation, a desktop computer, a notebook computer, a tablet computer, a mobile phone, a palm-sized computing device, a personal digital assistant (PDA), etc. The host machines 130-131 include host hardware, which includes one or more processing devices, memory, and/or additional devices such as a graphics card, hardware RAID controller, network controller, hard disk drive, universal serial bus (USB) device, internal input/output (I/O) device, keyboard, mouse, speaker, etc.

Each host machine 130-131 may include a hypervisor 135 (also known as a virtual machine monitor (VMM)) that emulates the underlying hardware platform for the virtual machines 145-148. In one embodiment, hypervisor 135 is a component of a host operating system (OS). Alternatively, the hypervisor 135 may run on top of a host OS, or may run directly on host hardware without the use of a host OS.

The hypervisor 135 manages system resources, including access to memory, devices, storage devices (e.g., shared storage), and so on. The hypervisor 135, though typically implemented in software, may emulate and export a bare machine interface (host hardware) to higher level software. Such higher level software may comprise a standard or real-time operating system (OS), may be a highly stripped down operating environment with limited operating system functionality, may not include traditional OS facilities, etc. The hypervisor 135 presents to other software (i.e., "guest" software) the abstraction of one or more virtual machines (VMs) 145-148, which may provide the same or different abstractions to various guest software (e.g., guest operating system, guest applications, etc.). Some examples of hypervisors include quick emulator (QEMU®), kernel mode virtual machine (KVM®), VMWare® Workstation, VirtualBox®, and Xen®.

Each host machine 130-131 hosts any number of virtual machines (VM) 145-148 (e.g., a single VM, one hundred VMs, etc.). A virtual machine 145-148 is a combination of guest software that uses an underlying emulation of the host machine 130-131 (e.g., as provided by hypervisor 135). The guest software may include a guest operating system, guest applications, guest device drivers, etc. Virtual machines 145-148 can be, for example, hardware emulation, full virtualization, para-virtualization, and operating system-level virtualization virtual machines. The virtual machines 145-148 may have the same or different guest operating systems, such as Microsoft® Windows®, Linux®, Solaris®, etc.

Each VM 145-148 may be associated with a particular virtual disk image or set of virtual disk images, each of which may be a resource in a storage domain 125-128. These disk images may appear to the virtual machine 145-148 as a contiguous block device, which may have a file system installed thereon. The guest operating system, guest applications, user data, and so forth may be included in one or more of the disk images.

The clients 120-122 may include computing devices that have a wide range of processing capabilities. Some of the clients 120-122 may be thin clients, which may have limited processing and memory capacities. For example, a thin client may a tablet computer, cellular phone, personal digital assistant (PDA), a re-purposed desktop computer, etc. Some of the clients 120-122 may be thick (fat) clients, which have powerful CPUs and large memory. For example, a thick client may be a dual-core or multi-core computer, workstation, graphics workstation, etc. The clients 120-122 may run client applications such as a Web browser and a graphic user interface (GUI). The clients 120-122 may also run other client applications, which receive multimedia data streams or other data from one or more host machines 130-131 and re-direct the received data to a local display or other user interface.

Each virtual machine 145-148 can be accessed by one or more of the clients 120-122 over the network 115. In one scenario, each virtual machine 145-148 provides a virtual desktop for a connected client 120-122. From the user's point of view, the virtual desktop may function as a physical desktop (e.g., a personal computer) and be indistinguishable from a physical desktop.

In one embodiment, the host machines 130-131 each include a lock manager 140. The lock manager 140 may manage locks, including both exclusive locks and shared locks, to resources in the shared storage 110 for virtual machines 145-148 that are collocated on a host machine 130, 131 with the lock manager 140. Lock manager 140 may also manage locks for the host machine 130, 131 on which it is located, as well as other applications or processes running on the host machine 130, 131.

Lock manager 140 manages locks by maintaining locking data structures in the storage domains 125-128. Each storage domain 125-128 may include multiple different locking data structures. The locking data structures may include flags that identify specific hosts to which specific resources are locked. Any lock manager 140 may read the locking data structures to determine whether a particular resource has an exclusive lock, a shared lock, or is free of locks. Additionally, any lock manager 140 may read the locking data structures to determine which hosts hold the locks to the various resources.

When a virtual machine 145-148 is to be loaded onto a host machine, lock manager 140 may obtain a lock for the host to the appropriate resources (e.g., disk images) associated with that virtual machine. Some virtual machines may be associated with a chain of disk images (e.g., a disk image that refers back to one or more previous disk images). A first disk image in a chain may be a live image to which changes may be recorded. All other disk images in the chain may be read only snapshots. The lock manager 140 may obtain shared locks for each of the snapshots in the chain, and obtain an exclusive lock for the live image in the chain. Therefore, hosts may still be able to run virtual machines that depend on one or more snapshots in the chain while the host holds the shared locks to those snapshots. This enables multiple virtual machines that are based on the same snapshot or set of snapshots to be run in parallel without generating copies of the snapshots.

Figure 2:
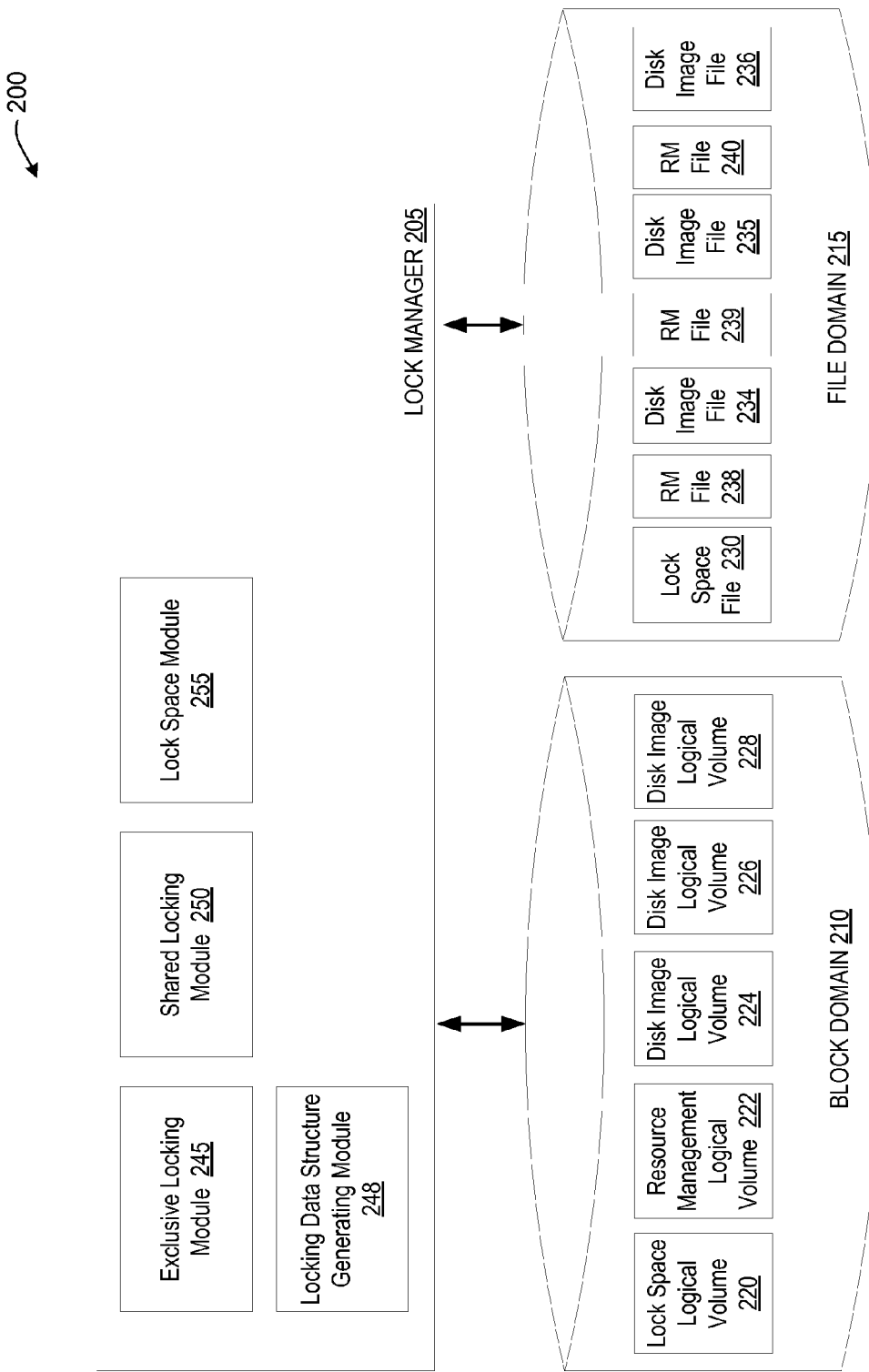
FIG. 2 is a block diagram of a lock manager, in accordance with one embodiment of present invention.

FIG. 2 is a block diagram of a lock manager 205, in accordance with embodiments of present invention. In one embodiment, lock manager 205 corresponds to lock manager 140 of FIG. 1. In one embodiment, lock manager 205 includes an exclusive locking module 245, a shared locking module 250, a lock space module 255 and a locking data structure (LDS) generating module 248. Alternatively, the functionality of one or more of the exclusive locking module 245, shared locking module 250, lock space module 255 and LDS generating module 248 may be subdivided into multiple modules or may be combined into a single module.

LDS generating module 248 generates locking data structures in storage domains 210, 215 for representing a lock state of resources on those storage domains 210, 215. For storage resources (e.g., virtual disk images, files, etc.), a locking data structure may be generated in the same storage domain that contains the resources being managed. However, the locking data structure may not be contiguous with those managed resources in the storage domain. There are two standard classes of storage domains 210, 215 on which LDS generating module 248 may create locking data structures. A first class of storage domain is a block domain 210. A block domain 210 includes a block level storage device that may be accessed using protocols such as SCSI, iSCSI, Fibre Channel, and so forth. A block domain 210 is divided into a sequence of blocks. Each block may represent a contiguous (or in some instances non-contiguous) region of memory (e.g., a sequence of bytes or bits). Typically, each block in a block level storage domain 210 will be equally sized. For example, each block may be 512 bytes, 1 megabyte (MB), 2 MB, 4 MB or another size.

A block domain 210 may be divided into a collection of logical volumes by a logical volume manger (not shown). Each logical volume may be a region of storage that is virtual and logically separated from an underlying physical storage device. Each logical volume may contain one or more resources and/or other information such as a locking data structure. Each logical volume may include a specified number of blocks. In one embodiment, block level storage domain 210 includes a separate logical volume for each disk image (referred to herein as a disk image logical volume 224-226). A disk image may be a single file, set of files or sequence of data (e.g., a contiguous or non-contiguous set of blocks in a block device) that contains the contents and structure representing a storage device such as a hard drive. Each disk image may contain all the information that defines a particular virtual machine.

In one embodiment, LDS generating module 248 generates two locking data structures that together can fully identify a locking state of every host that is attached to the block level storage domain 210 and of every resource (e.g., disk image logical volumes 224-228) that is contained in the block domain 210.

A first locking data structure may be a lock space logical volume 220. Each storage domain may be associated with a particular lock space. Each host that wants access to resources in the storage domain (e.g., in block domain 210) first registers with the lock space for that storage domain. A host may register to the lock space by acquiring a lock on a particular host identifier (ID) in the lock space. The lock space logical volume 220 may contain an entry for each host that is registered to the block level storage domain 210 indicating the host ID associated with that host. This host ID may be used to uniquely identify the host on the lock space. Additionally, each entry may include a timestamp that indicates a last time that the host having a particular host ID renewed its lease (also known as lock) on the host ID. In one embodiment, each block in the lock space logical volume 220 is associated with a particular host ID.

Lock space module 255 may be responsible for managing the lock space logical volume 220. When a host requests access to block domain 210, lock space module 255 may obtain a lock to a particular host ID for that host, and may write information identifying that host to a block in the lock space logical volume 220 associated with the particular host ID. The information written to the block may include an address of a host machine that is registering to the lock space of the block domain 210. The information may also include a time stamp indicating when the host registered to the block level storage domain and/or an expiration period indicating a time and date when the lease on the host ID will expire. The host may periodically renew its lease on the host ID, causing the expiration period to be reset. If a host's lease on a host ID expires, lock space module 255 may revoke that host's lock on the host ID.

In one embodiment, lock space module 255 acquires a delta lease on a lock space associated with the particular host ID for the host. A delta lease is relatively slow to acquire, and may involve a regular exchange of messages (e.g., input/output operations) to shared storage to confirm that the host is alive. Acquiring a delta lease involves performing reads and writes to a particular sector (e.g., a block) of storage separated by specific delays. Once acquired, a delta lease is periodically renewed by updating a timestamp in the block. Granting leases to host IDs prevents two hosts from using the same host ID and provides basic host liveliness information based on the renewals.

The second locking data structure that LDS generating module 248 creates in the block domain 210 is a resource management logical volume 222. The resource management logical volume 222 maintains lease information on each resource in pr associated with the block domain 210. The resource management logical volume 222 may contain a separate region for each resource stored in the block level storage domain 210. Each region may be divided into a series of subregions, with some or all subregions being associated with particular host IDs. In one embodiment, each subregion is a block (e.g., 512 bytes in one embodiment) in the block level storage domain 210. The subregions may include a first subregion that includes a leader block, a second subregion that includes a shared lock bitmap, and an additional separate subregion for each host ID that is used to track exclusive locks. In one embodiment, the additional separate subregions are used for the Paxos exclusive locking algorithm. For subregions associated with particular host IDs (e.g., each block in the resource management logical volume 222), a flag indicating that a particular host ID has an exclusive lock on a particular resource may be written. Additionally, the shared lock bitmap subregion may include flags indicating particular hosts having shared locks on the resource.

In an example, there may be 2000 possible resources, the block size may be 512 bytes, and there may be 2000 host IDs. Note that other numbers of resources and host IDs and other block sizes are also possible. In this example, the resource management logical volume 222 may be 2 gigabytes (GB), with 2000 1 MB regions, each having 2000 separate 512 byte subregions. In one embodiment, the resource management logical volume 222 includes 1 leader block, 4 blocks for the shared flags bitmap, and 2000 exclusive blocks, one for each host. Bytes at offsets 513-1024 may correspond to a first region and subregion associated with a particular resource and a particular host. If these bytes have a first state, this may indicate that the particular host has an exclusive lock on the particular resource. Additionally, four blocks (or a different number of blocks) within the resource management logical volume 222 may represent a shared lock bitmap. Each bit in the shared lock bitmap may be a shared lock flag that is associated with a particular host and resource pair. If the bit has a first state (e.g., a 1), this may indicate that the particular host has a shared lock on the particular resource. If the bit has a second state (e.g., a 0), this may indicate that the particular host does not have a shared lock on the particular resource.

Note that in an alternative embodiment, two different resource management logical volumes may be maintained. A first resource management logical volume may be maintained to track and manage shared locks on resources, and a second resource management logical volume may be maintained to track and manage exclusive locks on the resources.

Exclusive locking module 245 and shared locking module 250 may be responsible for managing the resource management logical volume 222. In one embodiment, exclusive locking module 245 acquires exclusive locks for hosts by writing exclusive lock flags to an appropriate region in the resource management logical volume associated with a host ID leased to the host and a resource ID for the resource in question. Exclusive locking module 245 may first check the resource management logical volume 222 to determine if any other hosts have an exclusive or shared lock on the resource before obtaining the exclusive lock for the host. If any other hosts have exclusive or shared locks on the resource, then exclusive locking module 245 may return a failure to a host that requested the lock. In one embodiment, the Paxos protocol is followed for performing exclusive locking.

In one embodiment, shared locking module 250 acquires shared locks for hosts by writing shared lock flags to an appropriate region in the resource management logical volume 222 associated with a host ID leased to the host and a resource ID for the resource in question. The appropriate region may be a particular bit in a shared lock bitmap. Shared locking module 250 may first check the resource management logical volume 222 to determine if any other hosts have an exclusive lock on the resource before obtaining the shared lock for the host. If any other hosts have an exclusive lock on the resource, then shared locking module 250 may return a failure to the requesting host. In one embodiment, shared locking module 250 first briefly obtains an exclusive lock to the resource before acquiring a shared lock to the resource. This may ensure that no other hosts acquire an exclusive lock to the resource while the shared locking module 250 is in the process of acquiring a shared lock for the resource. Once the shared lock is successfully obtained, then shared locking module 250 may release the exclusive lock on the resource.

In one embodiment, shared locking module 250 and exclusive locking module 245 acquire locks on resources using paxos leases. Paxos leases are generally fast to acquire, and may be made available to hosts as general purpose resource leases. Acquiring a paxos lease involves reads and writes to sectors associated with a maximum number of hosts in a specific sequence specified by the Disk Paxos algorithm.

As mentioned, a second class of storage domain is a file domain 215. A file domain includes a file system over a block device. Accordingly, data is managed as files as opposed to as blocks. In a file domain 215, each resource may be represented as a file or directory (e.g., disk image files 234-236). LDS generating module 248 may generate a lock space file 230 that is used to manage lock spaces on the file system level storage domain 215. The lock space file 230 may operate similarly to the lock space logical volume, except that it is structured as a file rather than a logical volume. LDS generating module 248 may additionally generate a separate resource management (RM) file 238-240 for each resource in the file system level storage domain 215. Each RM file 238-240 may include a separate region for each host ID. Each region in an RM file 238-240 may have exclusive lock flags written thereto. Each RM file 238-240 may additionally include a shared lock bitmap indicating which hosts have a shared lock on the resource. In an alternative embodiment, LDS generating module 248 may generate a single RM file that contains locking information for all resources on the file domain 215, similar to the resource management logical volume 222.

As previously mentioned, lock space module 255 may determine whether hosts that have locks to host IDs are still alive. When a host requests a shared lock to a resource, lock space module 255 may determine whether the host having the exclusive lock to the resource is still alive. This may include consulting the lock space logical volume 220 or lock space file 230 (as appropriate) to determine if that host recently updated its lease on the host ID assigned to the host. If not, then lock space module 255 may query that host. If no reply is received in response to the query, lock space module 255 may determine that the host with the exclusive lock is dead or otherwise unresponsive. Alternatively, lock space module 255 may assume that a remote host watchdog killed the machine if it wasn't able to renew the lease. Lock space module 255 may then release the exclusive lock to that host and release the lock to the host ID for the host. This frees other hosts to be able to use the freed host ID, and additionally frees hosts to be able to acquire shared or exclusive locks on the resource.

Lock space module 255 may perform a similar procedure if a request for an exclusive lock to a resource that already has an exclusive lock or shared lock to another host is received. Additionally, lock space module 255 may periodically or continuously perform checks to confirm the liveness of hosts (e.g., as per the delta lease algorithm).

Figure 3:
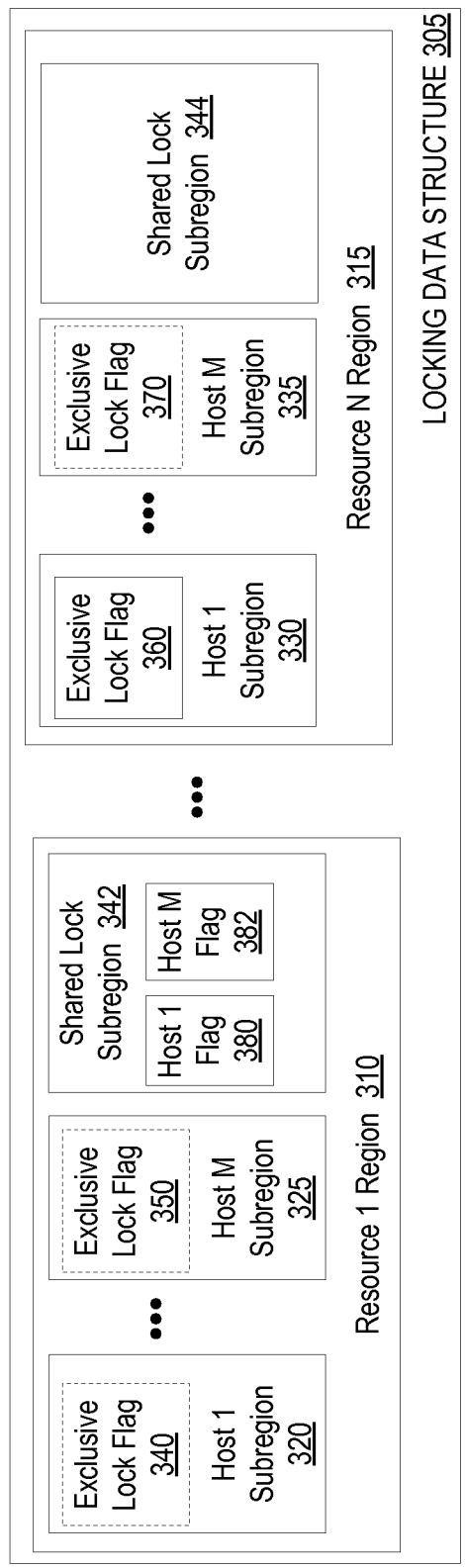
FIG. 3 is a block diagram of one embodiment of a locking data structure.

FIG. 3 is a block diagram of one embodiment of a locking data structure (LDS) 305. In one embodiment, the locking data structure 305 corresponds to resource management logical volume 222 of FIG. 2. Alternatively, the locking data structure may correspond to a resource management file. As shown, the LDS 305 includes a series of resource regions 1 through N (labeled as resource 1 region 310 to resource N region 315). Each resource region includes a sequence of host subregions 1 through M (labeled as host 1 subregion 320 through host M subregion 325 and host 1 subregion 330 through host M subregion 335). Each resource region 310, 315 additionally includes a shared lock subregion 342, 344, and may also include a leader subregion (not shown).

Each host subregion may include an exclusive lock flag 340, 350, 360, 370. Solid lines indicate that a flag is set in a host subregion, while dashed lines indicate a placeholder where a flag may be set. In the illustrated embodiment, within resource region N 315, host 1 subregion 330 has an exclusive lock flag 360 set in resource N region 315, indicating that host 1 has an exclusive lock on resource 1. However, no hosts have shared locks on resource N (e.g., no bits are set in shared lock subregion 340). In contrast, within resource 1 region 310 no hosts have exclusive locks, but shared lock subregion 342 has two shared lock flags set (host 1 flag 380 and host M flag 382) indicating that two hosts have shared locks on resource 1.

Figure 4:
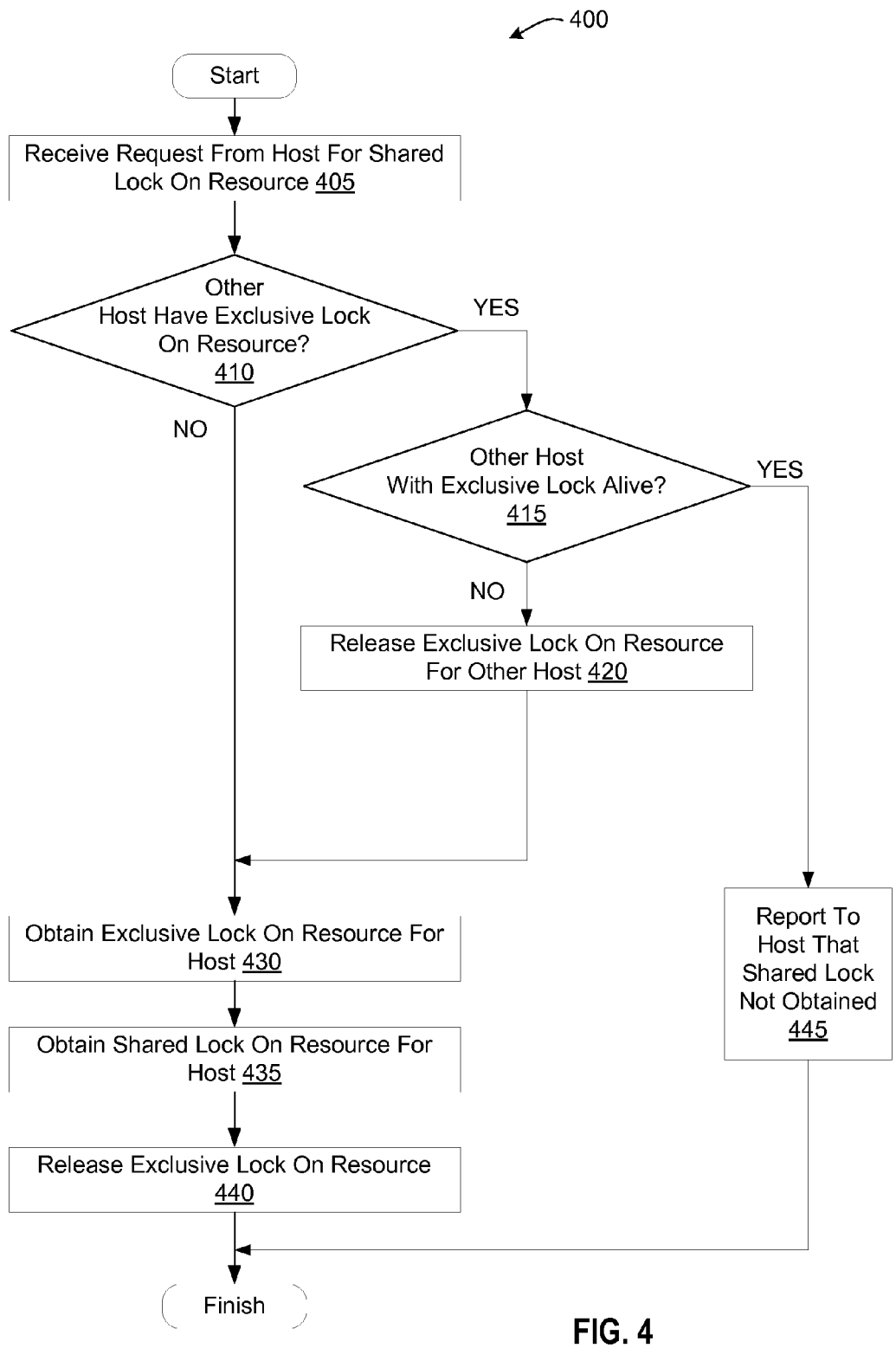
FIG. 4 is a flow diagram illustrating one embodiment of a method for managing a shared lock for a resource on a storage domain.
Figure 5:
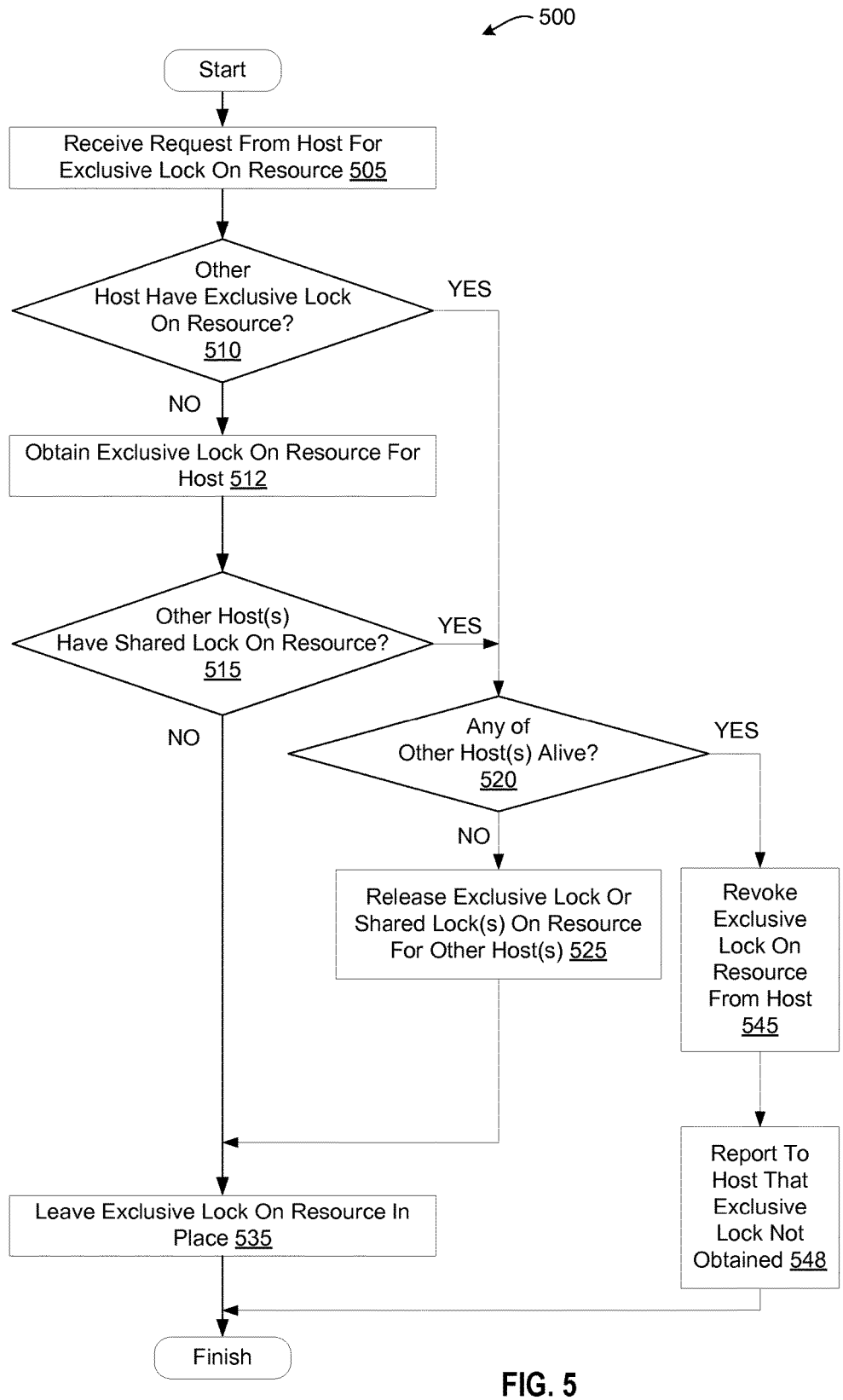
FIG. 5 is a flow diagram illustrating one embodiment of a method for managing an exclusive lock for a resource on a storage domain.

FIGS. 4-5 are flow diagrams showing various methods for managing locking by reading and writing to blocks and/or files on shared storage. These methods enable multiple hosts to share storage and resources without communicating with one another via a network. The hosts may have synchronized access to resources simply by reading from and writing to particular data structures in the shared storage. The methods may be performed by a computer system that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by the lock manager 205 of FIG. 2.

FIG. 4 is a flow diagram illustrating one embodiment of a method for obtaining a shared lock to a resource for a host. At block 405 of method 400, processing logic receives a request from a host for a shared lock on a resource. The host may be a host machine or a particular process (e.g., a virtual machine) running on a host machine.

At block 410, processing logic determines whether any other hosts have an exclusive lock on the resource. This check may be performed by reading a locking data structure. The locking data structure may be stored on the same storage domain as the resource, and may include a region associated with the resource. If the region in the locking data structure associated with the resource includes an exclusive lock flag (e.g., if the Paxos algorithm detects the presence of an exclusive lock), then processing logic may determine that another host already has an exclusive lock on the resource. If another host has an exclusive lock on the resource, the method proceeds to block 415. Otherwise, the method continues to block 430.

At block 415, processing logic determines whether the other host with the exclusive lock to the resource is alive. The exclusive lock flag in the locking data structure may indicate a host ID that has a lock on the resource. Processing logic may read a second locking data structure that grants locks to host IDs. Processing logic may look up the host ID that has the exclusive lock on the resource in the second locking data structure. This may reveal a time stamp indicating a last time that the host associated with that host ID refreshed its lock to the host ID and/or and expiration period. If the expiration period has lapsed, then the host may no longer be alive. If the host is still alive, the method proceeds to block 445, and processing logic reports to the host that no shared lock was obtained. If the other host is not alive, the method continues to block 420.

At block 420, processing logic releases the exclusive lock on the resource for the other host. In one embodiment, processing logic kills the other host. Alternatively, a host may kill itself (e.g., using a watchdog application) after not being able to renew his liveness on the storage for longer than the timeout. Processing logic may also release a lock for the other host to a specific host ID. The method then continues to block 430.

At block 430, processing logic obtains an exclusive lock on the resource for the host. This may include writing to a region of a locking data structure. The region that is written to may be associated with a host ID that was granted to the host and to the specific resource that the lock is to be obtained for. In one embodiment, processing logic writes an exclusive lock flag to the region.

At block 435, processing logic obtains a shared lock on the resource for the host. In one embodiment, processing logic writes a shared lock flag to a region of the locking data structure associated with the resource and the host. This may include setting an appropriate bit in a shared lock bitmap. At block 440, processing logic then releases the exclusive lock on the resource (e.g., by removing the exclusive lock flag from an exclusive lock region of the locking data structure associated with the host and the resource.

FIG. 5 is a flow diagram illustrating one embodiment of a method for obtaining an exclusive lock to a resource for a host. At block 505 of method 500, processing logic receives a request from a host for an exclusive lock on a resource.

At block 510, processing logic determines whether any other hosts have an exclusive lock on the resource. This check may be performed by reading a region of a locking data structure that is associated with the resource. If the region in the locking data structure associated with the resource includes an exclusive lock flag, then processing logic may determine that another host already has an exclusive lock on the resource. If another host has an exclusive lock on the resource, the method proceeds to block 520. Otherwise, the method continues to block 512.

At block 512, processing logic temporarily or momentarily obtains an exclusive lock to the resource for the host (e.g., by setting bits at an offset in a logical volume or file, where the offset is associated with a host ID assigned to the host and to the resource).

At block 515, processing logic determines whether any other hosts have shared locks on the resource. This check may also be performed by reading a region of a locking data structure that is associated with the resource. If the region in the locking data structure associated with the resource includes any shared lock flags, then processing logic may determine that one or more other hosts have a shared lock on the resource. If another host has a shared lock on the resource, the method proceeds to block 520. Otherwise, the method continues to block 535.

At block 520, processing logic determines whether any of the other hosts with exclusive locks or shared locks to the resource are alive. Processing logic may read a second locking data structure that grants locks to host IDs. Processing logic may look up the host IDs for hosts that have locks on the resource in the second locking data structure. For each such host, processing logic may determine whether the host is alive either from a time stamp and/or expiration period associated with that host or by querying the host. If any host with a lock to the resource is still alive, the method proceeds to block 545. If none of the hosts with locks on the resource are alive, the method continues to block 525.

At block 545, processing logic revokes the temporary exclusive lock on the resource. At block 548, processing logic reports to the host that requested the exclusive lock that no exclusive lock was obtained.

At block 525, processing logic releases the exclusive lock or shared lock (or locks) on the resource for the other host or hosts. Processing logic may also release a lock for the other hosts to specific host Ids for the shared flags. The method then continues to block 535.

At block 535, processing logic leaves the exclusive lock in place (e.g., extends the temporary exclusive lock to a standard exclusive lock). The method then ends.

Figure 6:
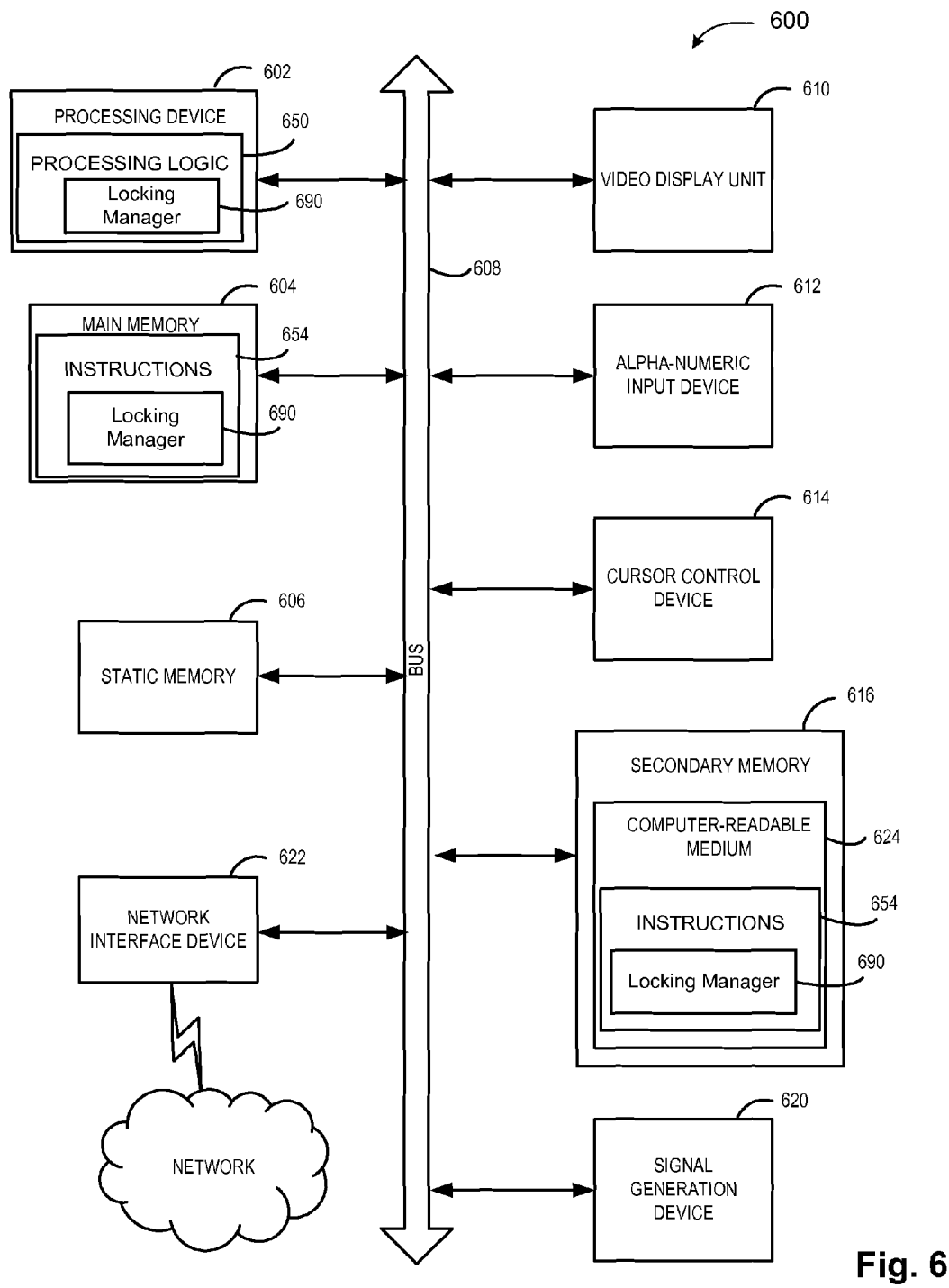
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. The computer system 600 may correspond to host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processing devices such as a microprocessor, central processing unit, or the like. The processing device may include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., virtual disk image manager 690, which may correspond to lock manger 205 of FIG. 2). The instructions 654 may also reside, completely or at least partially, within the main memory 604 and/or within the processing device 602 during execution thereof by the computer system 600; the main memory 604 and the processing device 602 also constituting machine-readable storage media.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The computer system 600 may additionally include an interrupt programming module (not shown) for implementing the functionalities of the interrupt programmer. The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "obtaining", "determining", "releasing", "performing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    generating, by a processing device, a first locking data structure and a second locking data structure on a storage device accessed by a host over a network, the first locking data structure providing locks to one or more host identifiers and the second locking data structure providing locks to one or more resources;
    acquiring, by the processing device, a lock for the host to one of the host identifiers in response to the host modifying the first locking data structure;
    receiving, by the processing device, a request from the host for a shared lock on the resource;
    obtaining, by the processing device, an exclusive lock on the resource for the host using the second locking data structure;
    subsequently obtaining, by the processing device, the shared lock on the resource for the host by writing a flag to the second locking data structure, wherein the flag indicates the host that has the shared lock on the resource; and
    releasing the exclusive lock on the resource after obtaining the shared lock.

2. The method of claim 1, wherein acquiring the lock to one of the host identifiers comprises using a delta lease procedure, and wherein obtaining the exclusive lock on the resource using the second locking data structure comprises using a Paxos locking procedure.

3. The method of claim 1, wherein the second locking data structure comprises a bitmap stored in a reserved space on the storage device, the bitmap representing locking states for the resource and for an additional resource, wherein writing the flag to the second locking data structure comprises setting a bit in the bitmap that is associated with the resource and the host.

4. The method of claim 1, wherein the storage device comprises at least one of a physical storage device or a logical storage device comprising a block domain and the second locking data structure comprises a logical volume on the block domain, and wherein the logical volume comprises a plurality of regions, each of the plurality of regions being associated with a different resource and comprising a plurality of subregions, a first subregion comprising a shared lock bitmap identifying hosts having a shared lock on the resource.

5. The method of claim 1, wherein the storage device comprises at least one of a physical storage device or a logical storage device comprising a file domain and, wherein the second locking data structure comprises a file in the file domain associated with the resource, the file comprising a plurality of regions, one of the plurality of regions comprising a shared lock bitmap identifying hosts having a shared lock on the resource.

6. The method of claim 1, wherein the storage device comprises the first locking data structure, the second locking data structure, and the resource, and wherein the host identifier uniquely identifies the host to the storage device.

7. The method of claim 1, further comprising:
    receiving a request from the host for an exclusive lock on a second resource;
    granting the exclusive lock on the second resource to the host;
    reading the second locking data structure to determine whether any hosts have shared locks on the second resource; and
    in response to determining that a second host has a shared lock on the second resource and that an additional criterion is satisfied, revoking the exclusive lock on the second resource from the host and providing a fail result to the host.

8. The method of claim 7, wherein the additional criterion is that the second host is responsive, the method further comprising:
    checking whether the second host is non-responsive; and
    in response to determining that the second host is non-responsive, revoking the shared lock from the second host and granting the exclusive lock of the second resource to the host.

9. A non-transitory computer readable storage medium comprising instructions that, when executed by a processing device, cause the processing device to:
    generate, by the processing device, a first locking data structure and a second locking data structure on a storage device accessed by a host over a network, the first locking data structure providing locks to one or more host identifiers and the second locking data structure providing locks to one or more resources;
    acquire, by the processing device, a lock for the host to one of the host identifiers in response to the host modifying the first locking data structure;
    receive, by the processing device, a request from the host for a shared lock on the resource;
    obtain, by the processing device, an exclusive lock on the resource for the host using the second locking data structure;
    subsequently obtain, by the processing device, the shared lock on the resource for the host by writing a flag to the second locking data structure, wherein the flag indicates the host that has the shared lock on the resource; and
    release the exclusive lock on the resource after obtaining the shared lock.

10. The non-transitory computer readable storage medium of claim 9, wherein acquiring the lock to one of the host identifiers comprise using a delta lease procedure, and wherein obtaining the exclusive lock on the resource using the second locking data structure comprises using a Paxos locking procedure.

11. The non-transitory computer readable storage medium of claim 9, wherein the second locking data structure comprises a bitmap stored in a reserved space on the storage device, the bitmap representing locking states for the resource and for an additional resource, wherein writing the flag to the second locking data structure comprises setting a bit in the bitmap is associated with the resource and the host.

12. The non-transitory computer readable storage medium of claim 9, wherein the storage device comprises at least one of a physical storage device or a logical storage device comprising a block domain and the second locking data structure comprises a logical volume on the block domain, and wherein the logical volume comprises a plurality of regions, each of the plurality of regions being associated with a different resource and comprising a plurality of subregions, a first subregion comprising a shared lock bitmap identifying hosts having a shared lock on the resource.

13. The non-transitory computer readable storage medium of claim 9, wherein the storage device comprises at least one of a physical storage device or a logical storage device comprising a file domain and, wherein the second locking data structure comprises a file in the file domain associated with the resource, the file comprising a plurality of regions, one of the plurality of regions comprising a shared lock bitmap identifying hosts having a shared lock on the resource.

14. The non-transitory computer readable storage medium of claim 9, wherein the storage device comprises the first locking data structure, the second locking data structure and the resource, and wherein the host identifier uniquely identifies the host to the storage device.

15. The non-transitory computer readable storage medium of claim 9, wherein the instructions further cause the processing device to:
receive a request from the host for an exclusive lock on a second resource;
momentarily grant the exclusive lock on the second resource to the host;
read the second locking data structure to determine whether any hosts have shared locks on the second resource; and
in response to determining that a second host has a shared lock on the second resource and that an additional criterion is satisfied, revoke the exclusive lock on the second resource from the host and providing a fail result to the host.

16. The non-transitory computer readable storage medium of claim 15, wherein the additional criterion is that the second host is responsive, and wherein the instructions further cause the processing device to:
check whether the second host is non-responsive; and
in response to determining that the second host is non-responsive, revoke the shared lock from the second host and granting the exclusive lock of the second resource to the host.

17. An apparatus comprising:
a memory; and
a processing device operatively coupled to the memory, wherein the processing device is to:
generate a first locking data structure and a second locking data structure on a storage device accessed by a host over a network, the first locking data structure providing locks to one or more host identifiers and the second locking data structure providing locks to one or more resources;
acquire a lock for the host to one of the host identifiers in response to the host modifying the first locking data structure;
receive a request from the host for a shared lock on the resource;
obtain an exclusive lock on the resource for the host using the second locking data structure;
subsequently obtain the shared lock on the resource for the host by writing a flag to the second locking data structure, wherein the flag indicates the host that has the shared lock on the resource, wherein the exclusive lock is a read-write lock that prevents other hosts from reading from or writing to the resource; and
release the exclusive lock on the resource after obtaining the shared lock.

18. The apparatus of claim 17, wherein the storage device comprises the first locking data structure, the second locking data structure and the resource, and wherein the host identifier uniquely identifies the host to the storage device.

19. The apparatus of claim 17, wherein the processing device is further to:
receive a request from the host for an exclusive lock on a second resource;
grant the exclusive lock on the second resource to the host;
read the second locking data structure to determine whether any hosts have shared locks on the second resource; and
in response to determining that a second host has a shared lock on the resource and that an additional criterion is satisfied, revoke the exclusive lock on the second resource from the host and provide a fail result to the host.

20. The apparatus of claim 19, wherein the additional criterion is that the second host is responsive, and wherein the processing device is further to:
check whether the second host is non-responsive; and
in response to determining that the second host is non-responsive, revoke the shared lock from the second host and grant the exclusive lock of the second resource to the host.

* * * * *